US006496232B1

United States Patent
Shinobu (10) Patent No.: US 6,496,232 B1
(45) Date of Patent: Dec. 17, 2002

(54) OPTICAL UNIT SEALING DEVICES FOR PROJECTION TELEVISION SETS

(75) Inventor: Masayoshi Shinobu, Kyoto Fu (JP)

(73) Assignee: Mitsubishi Digital Electronics America, Inc., Cypress, CA (US)

( * ) Notice: Subject to any disclaimer, the term of this patent is extended or adjusted under 35 U.S.C. 154(b) by 0 days.

(21) Appl. No.: 09/571,491

(22) Filed: May 15, 2000

(51) Int. Cl.$^7$ ............................................... H04N 5/645
(52) U.S. Cl. ..................... 348/825; 348/744; 348/748
(58) Field of Search ................................. 348/748, 749, 348/776, 778, 779, 781, 785, 805, 825, 826, 827; 315/1, 3; 313/11, 12, 22, 25, 292

(56) References Cited

U.S. PATENT DOCUMENTS

| | | | |
|---|---|---|---|
| 4,904,054 A | 2/1990 | Hiroshima | 350/253 |
| 4,948,226 A | 8/1990 | Ozaki | 350/245 |
| 5,010,396 A | 4/1991 | Hanyu et al. | 358/60 |
| 5,055,922 A | 10/1991 | Wessling | 358/60 |
| 5,537,167 A * | 7/1996 | Toide et al. | 348/825 |
| 5,682,077 A | 10/1997 | Hanssen et al. | 313/478 |
| 5,731,917 A | 3/1998 | Inoue | 359/820 |
| 5,764,312 A | 6/1998 | Okumura | 348/785 |
| 5,812,215 A * | 9/1998 | Yamada et al. | 348/825 |
| 6,104,554 A | 8/2000 | Bodurek, Jr. et al. | 359/820 |
| 6,115,082 A * | 9/2000 | Rudolph | 348/749 |
| 6,183,092 B1 | 2/2001 | Troyer | 253/31 |
| 6,188,165 B1 * | 2/2001 | Lee | 348/749 |

* cited by examiner

Primary Examiner—John Miller
Assistant Examiner—Trang U. Tran (57) ABSTRACT

A projection television set having a screen and three projection units each capable of projecting a monochromatic image onto the screen. The projection units each having a cathode ray tube (CRT) optically coupled to a projection lens, which includes both a C-lens and a compound lens. A spacer preferably having three optical passageways is coupled to and between the CRTs and projection lenses such that three coolant chambers are formed. Preferably, the spacer includes fluid passageways that interconnect the coolant chambers. Additionally, the packing members used to seal the coolant chambers preferably include position or alignment retaining components.

16 Claims, 7 Drawing Sheets

FIG. 9c

OPTICAL UNIT SEALING DEVICES FOR PROJECTION TELEVISION SETS

RELATED APPLICATION INFORMATION

This application is related to application Ser. Nos. 09/571, 037, 09/571,042, and 09/571,041, which are expressly incorporated herein by reference and filed on the same date.

FIELD OF THE INVENTION

The present invention relates generally to projection television sets, and more particularly to sealing devices for the optical unit of a projection television set.

BACKGROUND OF THE INVENTION

Projection television sets are a popular alternative to picture tube television sets, as they provide relatively large viewable screens that cannot be efficiently produced using conventional picture tubes. Projection television sets typically include an enclosure with an optical unit, a mirror, and electronic components for receiving and projecting an image onto a screen assembly mounted on the front of the enclosure.

Figure 1:
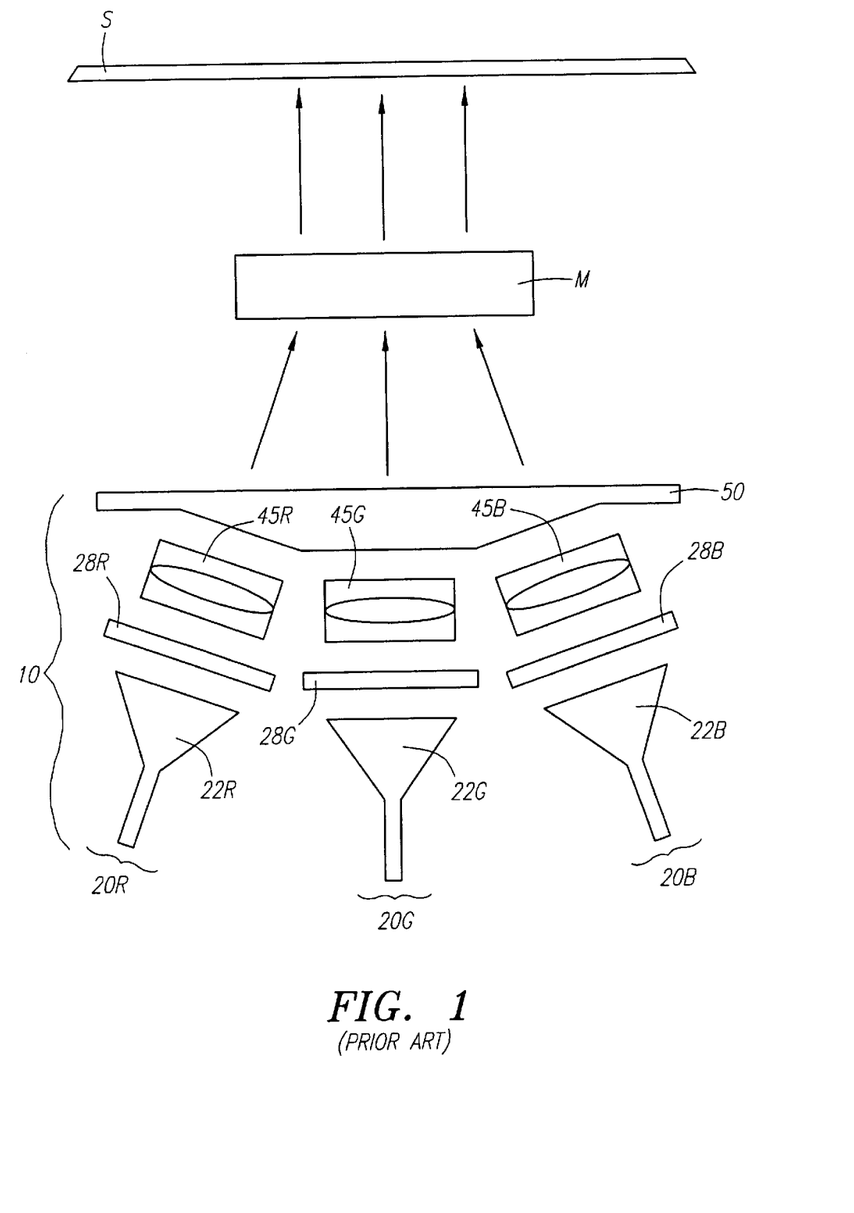
FIG. 1 is a schematic plan view of a projection television set of the prior art.

As shown schematically in FIG. 1, the optical unit 10 generally includes a set of projection units 20R, 20G, and 20B. Each projection unit projects an image, generally of a single color of light (red, green, or blue), onto the mirror M in the enclosure, which focuses the image onto an inside surface of the screen S. The projection units are mounted to a bracket 50 that is mounted to the enclosure (not shown). The bracket 50 holds the projection assemblies in place within the enclosure at their correct angular orientation.

Each projection unit includes a cathode ray tube (CRT) (22R, 22G, 22B), a projection lens assembly (45R, 45G, 45B), and a spacer (28R, 28G, 28B) interposed between the CRT and lens assembly. A liquid coolant is typically introduced between the projection lens and CRT into a cavity sealed by the spacer, CRT, and projection lens (see FIG. 3). The liquid coolant cools the face of the CRT by dissipating the heat radiating from the CRT and transferring it to the spacer. By lowering the operating temperature of the projection unit, optical performance is enhanced and component life is increased.

The existing optical units, however, have their disadvantages. From a cooling standpoint, the multiple spacers tend to be inherently inefficient. In addition, the packing used to seal the coolant chambers formed by the CRT-spacer-lens assemblies tends to be prone to misalignment during assembly and, thus, prone to leaks. Lastly, construction and assembly of the multiple components that go into existing optical units tends to be cumbersome and, thus, labor intensive. Therefore, it would be desirable to provide optical units that are easy to assemble and install, and that include a more efficient and reliable cooling system.

SUMMARY OF THE INVENTION

The present invention is directed to an improved optical unit of a projection television set, which facilitates manufacturability, optical performance, and component longevity. In one particularly innovative aspect, the optical unit of the present invention combines a bracket and individual projection unit-spacers into a single spacer-bracket. Moreover, a spacer-bracket in accordance with the present invention preferably comprises interconnected coolant chambers and reservoirs.

In another particularly innovative aspect, the packing members used to seal the coolant chambers include position or alignment retaining components. Such components aid in the assembly of the optical unit and tend to reduce the likelihood of coolant leaks.

In another innovative aspect, a coolant chamber fill port closure member includes a push plug and packing sleeve.

In another innovative aspect, the CRT holder is coupled to the spacer-bracket via screws and load distributing mounting brackets.

Other objects and features of the present invention will become apparent from consideration of the following description taken in conjunction with the accompanying drawings.

DETAILED DESCRIPTION OF PRIOR ART

Figure 2:
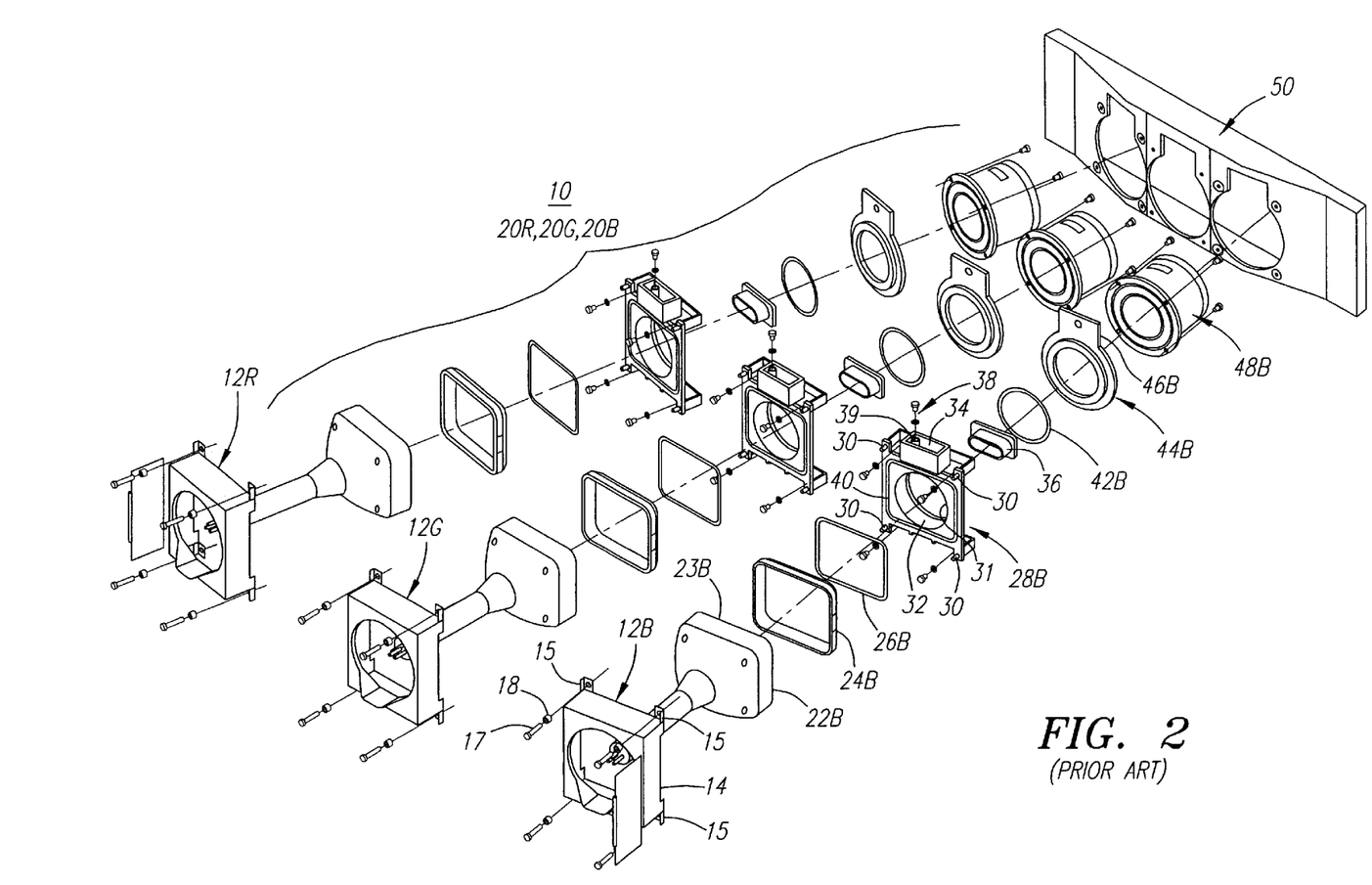
FIG. 2 is an exploded isometric view of an optical unit for a projection television set of the prior art.

Turning to FIG. 2, a more detailed drawing of a typical optical unit 10 for projection television (TV) set is shown. The optical unit 10 comprises three projection units 20R, 20G, and 20B that project a red, a green, and a blue picture on to a screen (not shown) of the TV set. Three separate CRT holders 12R, 12G, and 12B couple the projection units 20R, 20G, and 20B to a bracket 50 that is attached to the TV enclosure (not shown). In addition to holding the projection units in place within the enclosure, the bracket 50 places the projection units in their correct angular orientation relative to the mirror and screen (see FIG. 1). Because the projection units 20R, 20G, and 20B are substantially identical in construction, the remainder of this section will be directed to a single projection unit 20B.

The projection unit 20B includes a cathode ray tube (CRT) 22 with a generally flat glass face 23, a projection lens comprising both a monochromatic C-lens 44, which in this instance is blue, and a compound lens 48. A die-cast aluminum spacer.28 mounts between the CRT 22 and the C-lens 44. An image, displayed on the front face 23 of the CRT 22 is projected through the spacer 28, the C-lens 44 and the compound lens 48 onto the screen.

Figure 3:
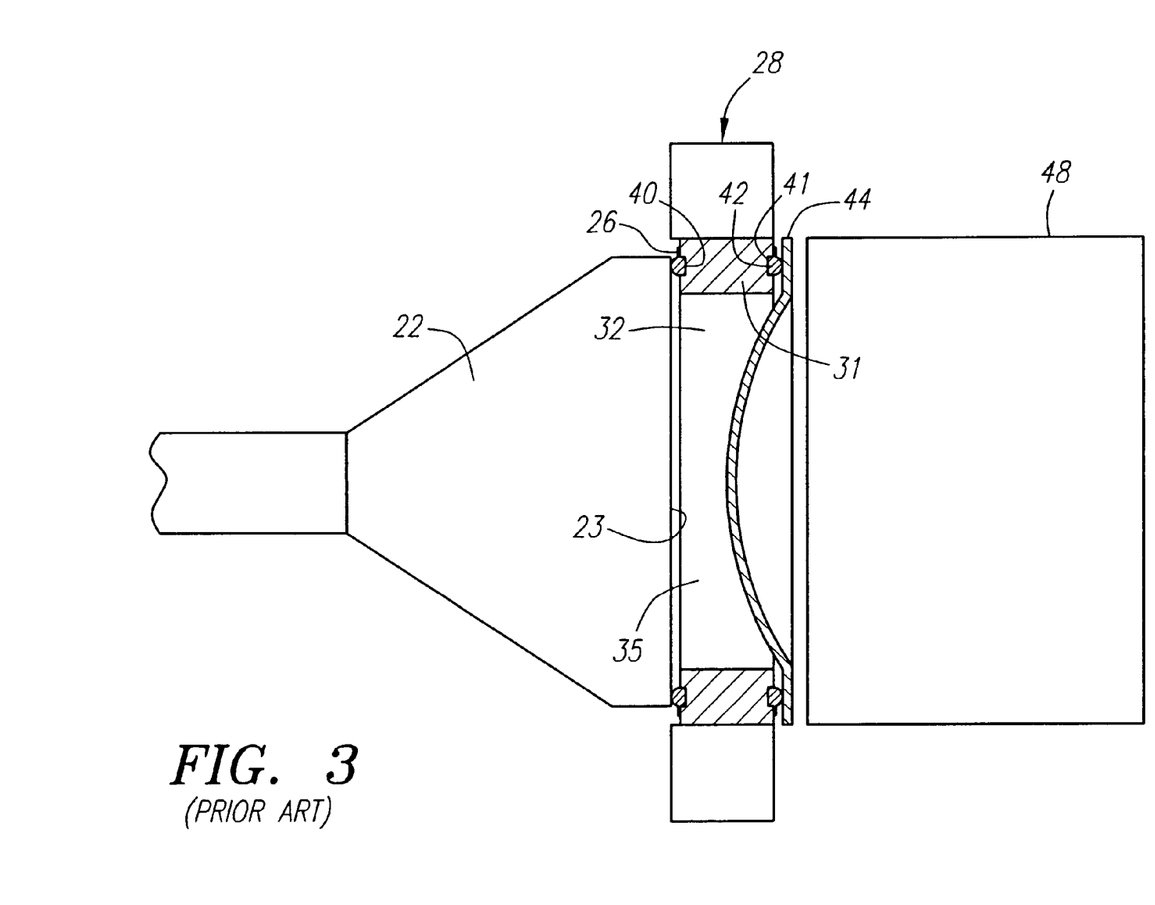
FIG. 3 is a partial side-sectional view of a coupled CRT-spacer-projection lens assembly for the optical unit shown in FIG. 2.

The spacer 28 includes a passageway 32, which receives the contoured portion of the C-lens 44 (see FIG. 3). The C-lens 44 is seated on packing material 42 positioned in an annular groove 41 formed in the face of the spacer 28 on the side of the C-lens 44. The packing material 42, which is in the form of an o-ring, creates a seal between the C-lens 44 and spacer 28 when the C-lens 44 is properly coupled to the spacer 28. The C-lens 44 and compound lens 48 are coupled to the spacer 28 with a set of screws.

The CRT 22 is positioned relative to the spacer 28 via a frame-like member 24. When the projection unit 20B is assembled, the face 23 of the CRT 22 is seated on packing material 26 positioned in a generally rectilinear groove 40 formed in the face of the spacer 28 on the side of the CRT 22. As shown in FIG. 3, a cavity 35 sealed by the face 23 of the CTR 22, the wall 31 of the passageway 32 in the spacer 28, and the contoured portion of the C-lens 44 is filled with a coolant to cool the face 23 of the CRT 22. The coolant enters through a fill port 39 formed in the top of the spacer 28. During assembly, the cavity 35 is overfilled to eliminate air bubbles and effectively optically couple the face 23 of the CRT 22 and the C-lens 44. The excess coolant flows into a reservoir 34 formed at the top of the spacer 32 and, also, out of the fill port 39. Prior to filling, a zero-pressure diaphragm gum tank 36 is inserted into the reservoir 34 in direct communication with the coolant and is held in place by a cover plate 46 formed in the top of the C-lens 44. The gum tank 36 maintains a constant pressure in the reservoir 34 and cavity 35 as the coolant expands and contracts with changes in operating temperatures. A closure member 38 in the form of an o-ring mounted on a screw seals the fill port 39.

The x-ray shielding holder 12 includes an open ended box-like body 14 that captures the CRT 22. Mounting tabs 15 are positioned on the corners of the body 14 and include a hole to receive mounting posts 30 formed on the corners of the spacer 28. The mounting posts 30 include tapped holes formed therein. The CRT22B is coupled to the spacer 28B by coupling the holder 12B to the spacer 28B with a set of four screws 17. The screws 17, which pass through the mounting tabs 15 and screw into the spacer's mounting posts 30, are spring loaded against the holder 12B with coil springs 18 to allow for thermal expansion of the projection unit 20B.

Because of the number of components and the potential problems associated therewith, the manufacture and assembly of existing optical units 10 tends to be cumbersome and labor intensive.

Another disadvantage of the existing optical units 10 relates to cooling and its effect on optical performance and component life. As noted earlier, coolant is introduced into a chamber formed between the face 23 of the CRT 22 and the C-lens 44 to cool the face 23 of the CRT 22 by dissipating the heat throughout the liquid and transferring it to the spacer 28. Dissipation of heat emanating from the CRT 22 is necessary to achieve optimal optical performance and to extend the life of the components of the projection unit 20B, particularly the CRT 22. Stated somewhat differently, the optical performance of the projection unit 20B degenerates and the life of the projection unit 20B components decreases as the operating temperature of the projection unit 20B increases. Thus, it is desirable to reduce the operating temperature of the projection unit 20B to improve its optical performance. However, the amount of heat transferred from the coolant to the spacer 28 is limited by the spacer's 28 size and configuration, and could be further hindered by leaks in its packing components. Because the C-lens packing 42, the CRT packing 26, and the closure 38 packing are generally o-rings, they have a tendency to roll-out or move during assembly and, thus, may be misaligned during final assembly resulting in a leak during operation.

Thus, it would be desirable to provide an optical unit having more reliable sealing and better heat transfer. Also, it would be desirable to reduce the number of optical unit components to simplify construction and assembly of the optical unit 10.

DETAILED DESCRIPTION OF PREFERRED EMBODIMENT

Figure 4:
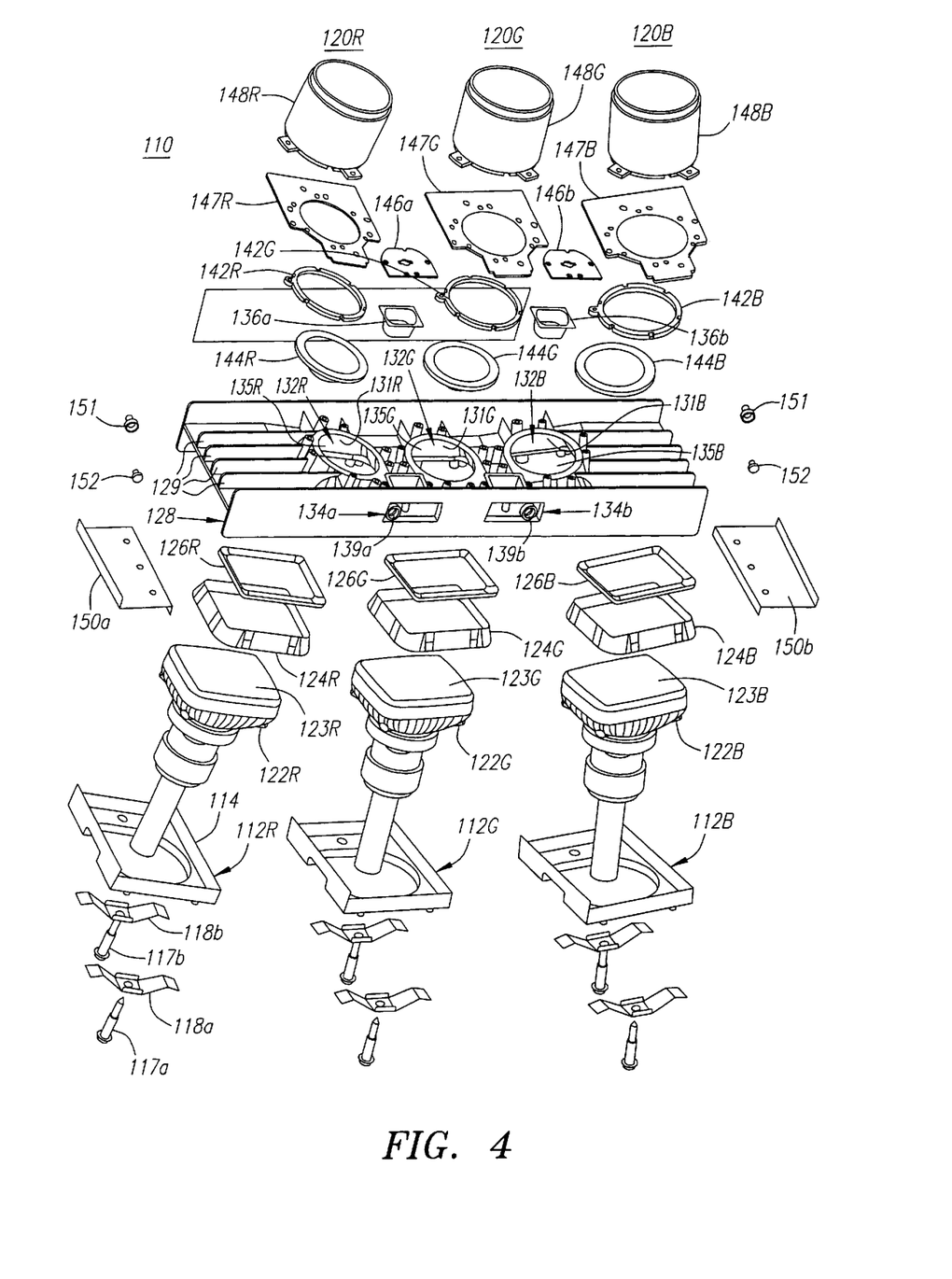
FIG. 4 is an exploded isometric view of a projection television optical unit of the present invention.

Turning to FIG. 4, a projection TV optical unit 110 of the present invention is shown. Like the optical unit 10 of the prior art, the optical unit 110 of the present invention comprises three projection units 120R, 120G, and 120B that project a red, a green, and a blue picture on to a screen (not shown). However, the optical unit 110 of the present invention preferably combines the typical enclosure mounting bracket and the individual projection unit spacers (see components 28 and 50 in FIGS. 1–3) into a single component, i.e., the spacer-bracket 128. The single. spacer-bracket 128 optically couples the CRT and projection lens of each projection unit and positions each projection unit in its correct angular orientation within the TV set enclosure. By combining the spacers and mounting bracket into a single unit, the present invention advantageously reduces the overall number of optical unit components and, thus, improves manufacturability of the optical unit 110. Also, by combining the spacers into a single unit, the heat transfer properties of the spacers have been optimized and enhanced, which facilitates improved optical performance and increased component longevity, especially the longevity of the CRTs.

Figure 5:
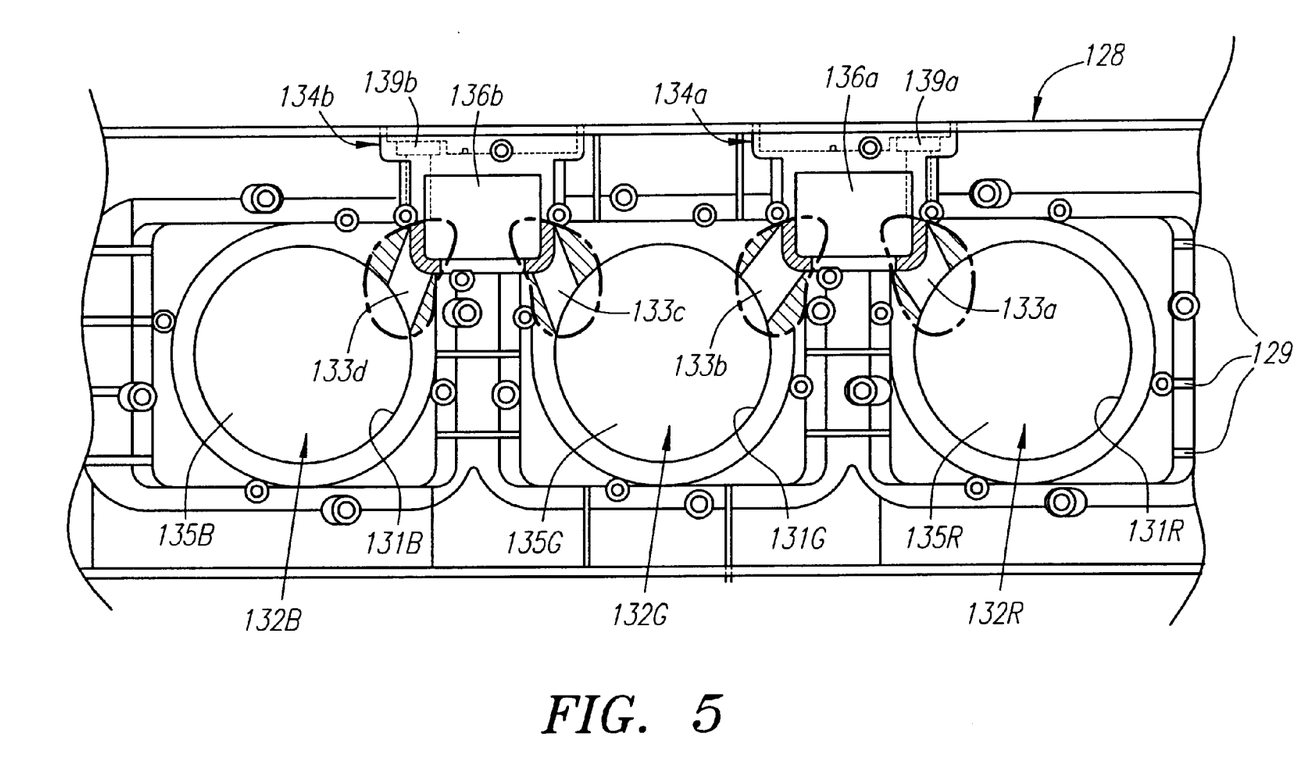
FIG. 5 is a partial plan view of the spacer-bracket of the optical unit of the present invention as shown in FIG. 4 and taken from the C-lens side of the spacer-bracket.
Figure 6:
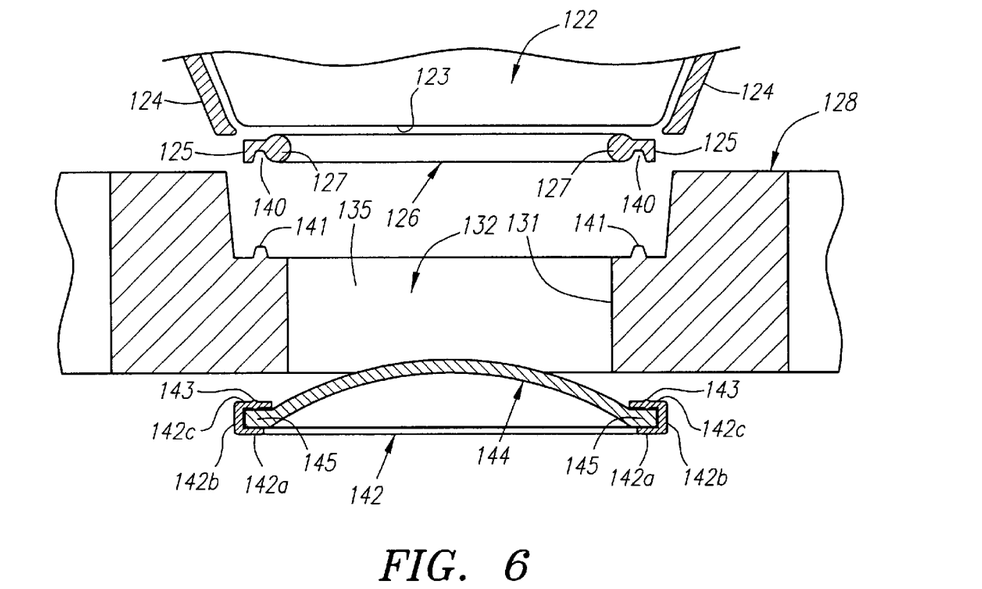
FIG. 6 is an exploded partial side section view of a CRT-spacer-bracket-projection lens assembly of the optical unit of the present invention as shown in FIG. 4.

Referring in detail to FIGS. 4–6, each projection unit 120R, 120G, and 120B is shown to include a cathode ray tube (CRT) 122R, 122G, and 122B with a generally flat glass face 123R, 123G, and 123B, a projection lens comprising both a monochromatic C-lens 144R, 144G, and 144B, i.e., red, green and blue in color, and a compound lens 148R, 148G, and 148B. A die-cast aluminum spacer-bracket 128 mounts between the CRTs 122R, 122G, and 122B and the corresponding C-lenses 144R, 144G, and 144B. An image displayed on the front face 123R, 123G, and 123B of each of the CRTs 122R, 122G, and 122B is projected through the spacer-bracket 128, the corresponding C-lens 144R, 144G, and 144B, and the corresponding compound lens 148R, 148G, and 148B, onto the screen (not shown) of the TV set.

The spacer-bracket 128 is generally I-beam shaped with three (3) optical passageways 132R, 132G, and 132B extending through the central portion of the spacer-bracket 128. To facilitate heat transfer, the spacer-bracket 128 is preferably constructed with fluid passageways 133a, 133b, 133c, and 133d that interconnect cooling chambers 135R, 135G, and 135B formed by coupling the CRTs 122R, 122G, and 122B and C-lenses 144R, 144G, and 144B to the spacer-bracket 128. The spacer-bracket 128 also preferably includes a series of heat exchanging ribs 129 extending from its central portion. By allowing the coolant to flow between chambers and by increasing the surface area from which the heat can radiate, a greater amount of heat emanating from the CRTs will tend to dissipate in the coolant, tending to reduce operating temperatures and thermal expansion of the components and, thus, improve optical performance and component longevity.

The three interconnected coolant cavities 135R, 135G, and 135B are formed by the face 123R, 123G, and 123B of each CRT 122R, 122G, and 122B, the wall 131R, 131G, and 131B of each passageway 132R, 132G, and 132B, and the contoured portion of each C-lens 144R, 144G, and 144B. While one skilled in the art would appreciate that a single fill port and coolant reservoir would be sufficient to fill and communicate with interconnected coolant cavities 135R, 135G, and 135B, the spacer-bracket 128 preferably includes two fill ports 139a and 139b and two coolant reservoirs 134a and 134b to facilitate coolant filling and reduce overall assembly time for the optical unit 110. In addition, having two fill ports facilitates removal of extraneous air bubbles in the system.

To fill the coolant cavities 135R, 135G, and 135B, liquid coolant is introduced through the first fill port 139a into coolant cavity 135R and through the second fill port 139b into coolant cavity 135B. The liquid overflows from these cavities through passages 133a and 133d into coolant reservoirs 134a and 134b and through passages 133b and 133c into coolant cavity 135G. Prior to filling, however, two zero-pressure diaphragm gum tanks 136a and 136b are inserted into the reservoirs 134a and 134b. The gum tanks 136a and 136b, which are held in place by cover plates 146a and 146b, remain in direct communication with the filled coolant. The gum tanks 136a and 136b maintain a constant pressure in the reservoirs 134a and 134b and chambers 135R, 135G, and 135B as the coolant expands and contracts with changes in operating temperatures.

To facilitate sealing between the C-lenses 144R, 144G, and 144b and the spacer-bracket 128 and to reduce the likelihood of leaks do to misalignment or rolling of the packing material, the flange 145 of each C-lens 144R, 144G, and 144B is retained by a packing ring 142R, 142G, 142B. Referring to FIG. 6, each packing ring 142 is preferably C-shaped in cross-section and includes first and second leg portions 142a and 142c, and a central portion 142b. Fully capturing the flange 145 of the C-lens 144 within the packing ring 142 tends to alleviate assembly complications due to movement of the packing material. The packing rings 142R, 142G, and 142B create a seal between the C-lenses 144R, 144G, and 144B and spacer-bracket 128 when the C-lenses 144R, 144G, and 144B, the compound lenses 148R, 148G, and 148B, and the lens mounting plates 147R, 147G, and 147B are properly coupled to the spacer-bracket 128, on the side of the C-lenses 144R, 144G, and 144B. This seal is enhanced by a preferably circular shaped annular bead 143 formed in the second leg portion 142c of the packing ring 142. The bead 143, which creates a thickened portion in the ring, is sandwiched between the flange 145 of the C-lens 144 and the spacer 128.

Turning to the CRTs 122R, 122G, and 122B, they are positioned relative to the spacer-bracket 128 via frame-like members 124R, 124G, and 124B. When the projection units 120R, 120G, and 120B are assembled, the faces 123R, 123G, and 123G of the CRTs 122R, 122G, and 122B are seated on packing members 126R, 126G, and 126B. Referring to FIG. 6, the packing member 126 includes a sealing member 127 preferably having a circular cross-section and a retaining member 125 preferably having an L-shaped cross-section extending outwardly from the circular cross-section and forming a recess 140 there between. The sealing member 127, which is thicker than the retaining member, is sandwiched between the face 123 of the CRT 122 and the spacer-bracket 128 to form a seal therebetween. A packing tab 141, which extends outwardly from the spacer-bracket 128 about a generally rectangular shaped recess 128a, is received in the recess 140 formed between the sealing and retaining members 127 and 125 of the packing member 126. With the retaining member 125 overlapping the tab 141, the packing member 126-is retained in position during assembly and tends to be less likely to become misaligned and cause a leak.

Figure 7:
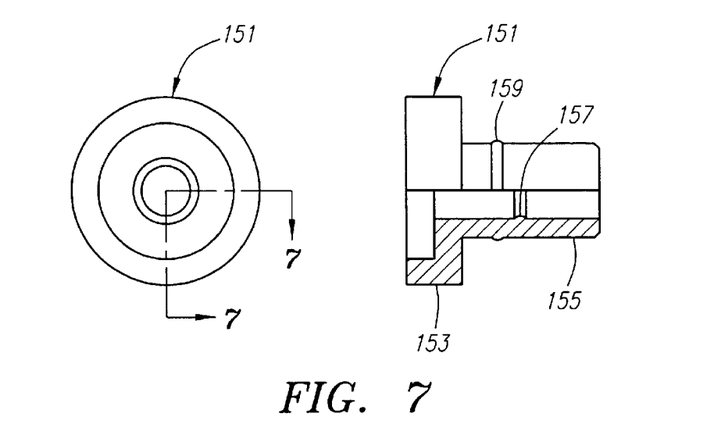
FIG. 7 is a partial sectional plan view of a packing sleeve of a fill port closure member of the present invention.
Figure 8:
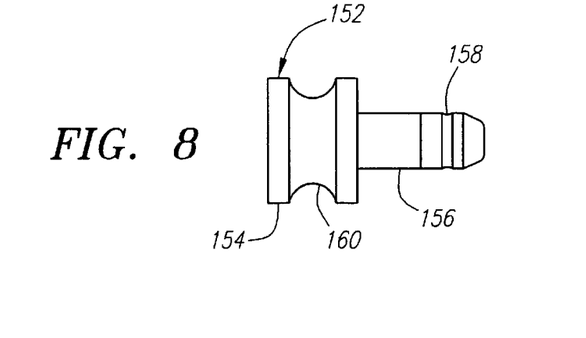
FIG. 8 is a plan view of a push plug of a fill port closure member of the present invention.
Figure 9A:
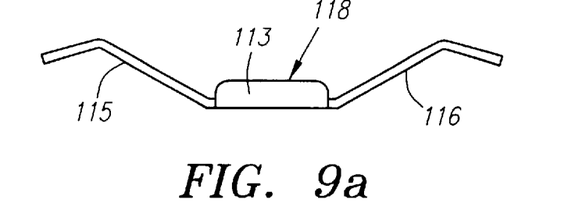
FIGS. 9a, 9b and 9c are side, top, and rear plan views of a load distributing mounting bracket and housing member of the x-ray shielding holder of the present invention.
Figure 9B:
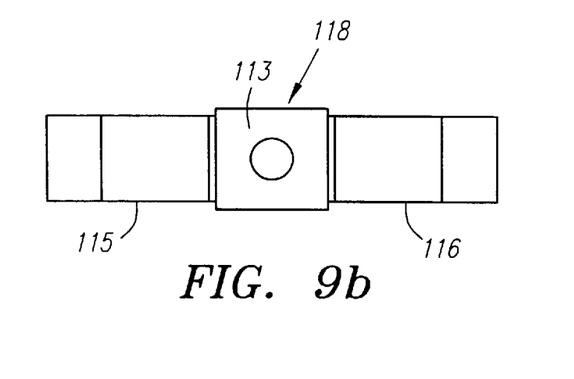
Figure 9C:
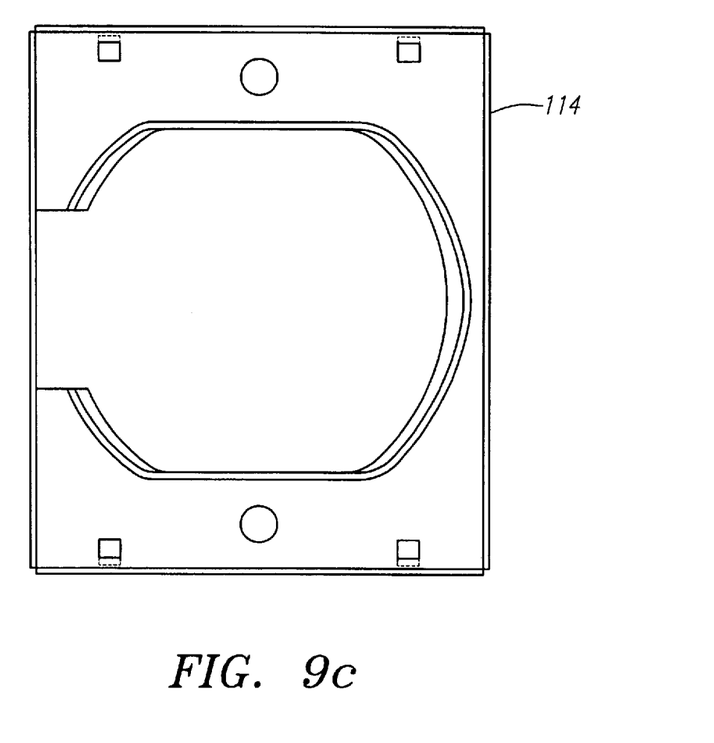

Referring to FIGS. 4, 7 and 8, a closure member preferably comprising a push plug 152 and packing sleeve 151 is shown. As shown in FIG. 7, the packing sleeve 151 includes a tubular head 153 and an elongated tubular body 155 having a smaller diameter than the tubular head 153. A first annular bead 157 is formed on the interior of the body 155 and a second annular bead 159 is formed on the exterior of the body 155. As shown in FIG. 8, the plug 152 includes a head portion 154 having a grip 160 formed about its circumference. An elongated body 156 extends from the head 154 and includes a recess 158 formed about its circumference. When the plug 152 and packing sleeve 151 are pressed into place in the fill port 139, the recess 158 in the body 156 of the plug 152 engages the first bead 157 on the interior of the packing sleeve 151 and is retained in place. When in place, the plug 152 forces the second bead 159 on the packing sleeve 151 against the wall of the fill port 139 to create a seal between the packing sleeve 151 and the fill port 139 wall. Because the plug 152 and packing sleeve 151 are simply pushed into place to seal a fill port 139, the likelihood of leakage do to misalignment of the packing sleeve 151 tends to be reduced and sealing of the coolant chambers and reservoirs tends to be enhanced.

Referring to FIGS. 4 and 9a–9c, x-ray shielding holders 112R, 112G, and 112G are shown to include an open ended box-like body 114 adapted to capture a corresponding CRT 122R, 122G, or 122B. A pair of mounting screws 117a and 117b are used to couple the holder 112 and CRT to the spacer-bracket 128. The screws 117a and 117b are spring loaded against the holder 112 with a pair of spring loaded brackets 118a and 118b. The brackets 118a and 118b preferably include a central portion 113 and a pair of arms 115 and 116 that extend outwardly at an angle from the central portion 113. The screws 117a and 117b pass through holes formed in the central portion 113 of the brackets 118a and 118b and in the central portion of the holder 114 adjacent the top and bottom edges. When screwed into place, the load applied to the central portion 113 of the brackets 118a and 118b by the head of the screws 117a and 117b is equally distributed along the arms 115 and 116 to the opposing ends of the top and bottom edges of the holder 114. In addition to reducing the number of components and, thus, improving the manufacturability of the optical unit 110, the holder 114 tends to improve optical performance of the optical unit 110. By applying a more uniform spring load to the holder 114, any performance degradation resulting from optical misalignment due to the thermal expansion of the components tends to be reduced.

Lastly, referring back to FIG. 4, a pair of enclosure mounting brackets 150a and 150b are attachable to the spacer-bracket 128 and the enclosure to hold the optical unit 110 in place within the enclosure (not shown).

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed is:

1. A projection television set comprising
a plurality of projection units, each of said plurality of projection units comprising a cathode ray tube (CRT) optically coupled to a lens,
a spacer interposing said CRT and lens of each of said plurality of projection units, a first packing member sealingly coupling said CRT and said spacer, said first packing member comprising a sealing portion and a retaining portion operably engaging said spacer, and a second packing member sealingly coupling said lens and said spacer, said second packing member comprising integrally formed retaining and sealing portions, said retaining portion holding said lens.

2. The projection television of claim 1, wherein said sealing portion is thicker than said retaining portion.

3. The projection television of claim 1, wherein said sealing portion is circular in cross-section.

4. The projection television of claim 3, wherein said retaining portion of said first packing member is L-shaped in cross-section.

5. The projection television of claim 1, wherein said retaining and sealing portions of said first packing member form a recess therebetween.

6. The projection television of claim 5, further comprising a retaining tab formed on said spacer, said tab being retained in said recess of said packing member.

7. The projection television of claim 3, wherein said retaining portion of said second member is C-shaped in cross-section.

8. The projection television of claim 7, wherein said retaining member comprises first and second leg portions and a central portion, and wherein said sealing member is formed in said second leg portion.

9. An optical unit assembly for a projection television set comprising a cathode ray tube (CRT), a lens, a spacer interposing said CRT and said lens, a first packing member mounted and creating a seal between said CRT and said spacer, said first packing member comprising a sealing portion and a retaining portion operably engaging said spacer, and a second packing member mounted and creating a seal between said lens and said spacer, said second packing members comprising a retaining portion holding said lens and a sealing portion integrally formed with said retainer portion.

10. The optical unit of claim 9, wherein said sealing portion is thicker than said retaining portion.

11. The optical unit of claim 9, wherein said sealing portion is circular in cross-section.

12. The optical unit of claim 11, wherein said retaining portion of said first packing member is L-shaped in cross-section.

13. The optical unit of claim 9, wherein said retaining and sealing portions of said first packing member form a recess therebetween.

14. The optical unit of claim 13, further comprising a retaining tab formed on said spacer, said tab being retained in said recess.

15. The optical unit of claim 11, wherein said retaining portion of said second member is C-shaped in cross-section.

16. The optical unit of claim 15, wherein said retaining member comprises first and second leg portions and a central portion, and wherein said sealing member is formed in said second leg portion.

* * * * *